(No Model.) 2 Sheets—Sheet 1.

W. T. GOOLDEN & L. B. ATKINSON.
ELECTRIC GENERATOR OR MOTOR.

No. 494,856. Patented Apr. 4, 1893.

Attest.
Wm. T. Hall
F. L. Middleton

Inventors:
W. T. Goolden &
L. B. Atkinson
By Richards & Co
Attys

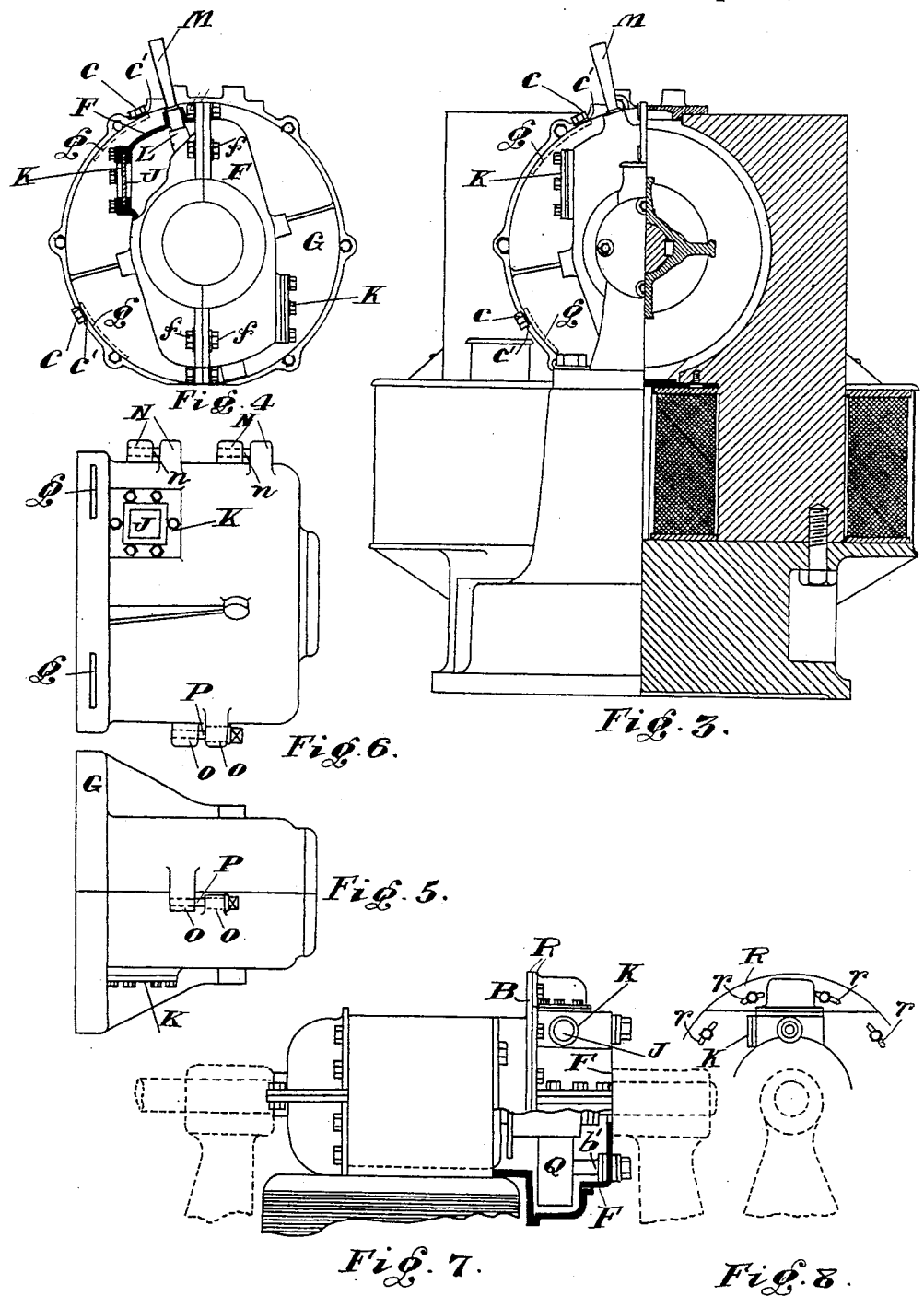

UNITED STATES PATENT OFFICE.

WALTER THOMAS GOOLDEN AND LLEWELYN BIRCHALL ATKINSON, OF LONDON, ENGLAND.

ELECTRIC GENERATOR OR MOTOR.

SPECIFICATION forming part of Letters Patent No. 494,856, dated April 4, 1893.

Application filed January 3, 1893. Serial No. 457,091. (No model.) Patented in England June 17, 1892, No. 11,403.

*To all whom it may concern:*

Be it known that we, WALTER THOMAS GOOLDEN and LLEWELYN BIRCHALL ATKINSON, both residing at London, England, have invented an Improvement in Electric Generators or Motors, (which has been patented to us in Great Britain under No. 11,403, and dated the 17th day of June, 1892,) of which the following is a specification.

Our invention relates to electric generators and motors particularly to those for use in mines where they may work in explosive or inflammable atmospheres or where the working parts of the machine have to be protected from dust, damp, or mechanical injury from contact with foreign substances.

Our invention has for its object the special construction and arrangement of covers over the armature, commutator, and brushes, describing means for removing the covers with great facility for inspection and repairs, for adjusting and regulating the positions of the brushes upon the commutator from the exterior and for keeping the inclosed volume of gas or atmosphere within the case as small as possible, by the use of pockets or recesses for containing the brushes.

In order that our invention may be the better understood we will now proceed to describe the same in relation to the drawings hereunto annexed reference being had to the letters marked thereon.

Like letters refer to like parts in the various figures.

Figure 1:
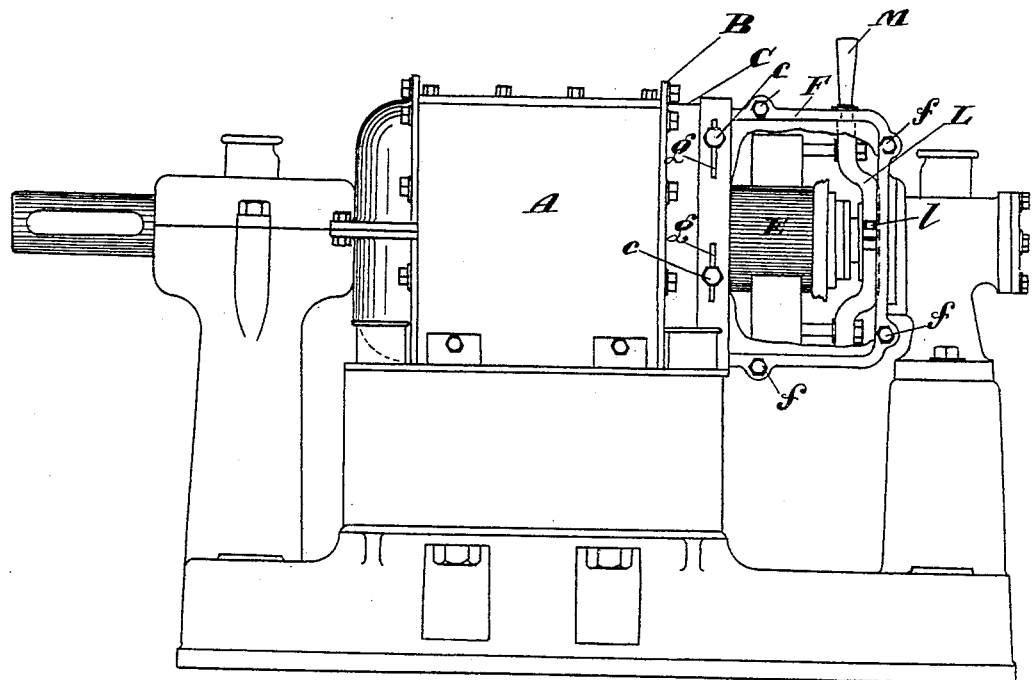
Figure 2:
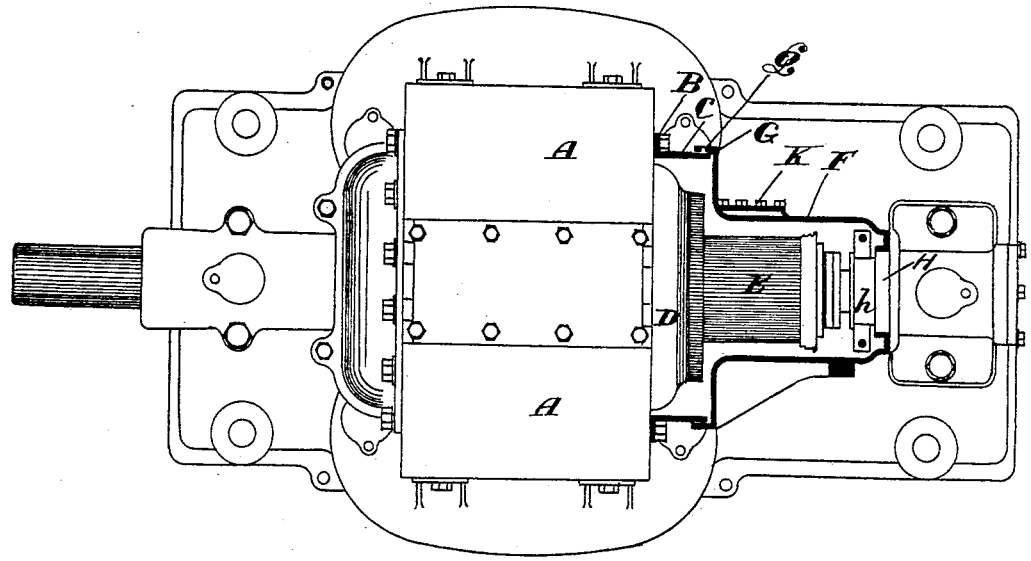

Figure 1 is a front elevation of a motor or generator with casings, the casing over the commutator being broken away to show the brushes and brush carrier and showing the pockets or expanded portions of the cover containing the brushes. Fig. 2 is a plan of the same with commutator cover in section. Fig. 3 is an end view half in section half in full. Fig. 4 is an end view of the commutator casing showing part in section where the handle engages through the casing with the brush carrier and showing the expanded covering or pocket in the cover containing the brushes. Figs. 5 and 6 show modified means for fastening the detachable commutator casing together. Figs. 7 and 8 are a part sectional elevation and end view of a modified form in which the brushes are carried direct on the adjustable casing.

Our invention consists in the particular construction and arrangement of casings and parts in connection therewith whereby the objects hereinbefore described are carried out.

To carry our invention into effect we attach rigidly to the pole pieces A of the machine, a casing B having a projecting rim C (preferably cylindrical in form) which covers over the outside of the right hand end of the armature D.

The commutator E is covered over by an oblong cover F which is made in halves and jointed together by bolts $f$ or other suitable devices, being for the most part a closely or nearly approaching fit to the commutator, but expanding into recesses or pockets to contain the brushes. It has a cylindrical part G which fits tightly over the rim C so as to make a flame tight joint therewith. The right hand side of the casing F (Fig. 2) is journaled free to turn but air tight upon the bush or bearing brass H. Windows J are arranged upon detachable doors K at the side of the casing F, so that the brushes may be viewed through the windows, or if necessary the detachable door can be removed. In the cylindrical part G one or more slots $g$ are provided through which screws $c$ having spring washers $c'$ under their heads, penetrate and are screwed into the part G; this tends to maintain the casing F in a fixed position against any tendency to movement from vibration or other such causes.

The brush carrier L where used is made in halves and jointed by screws $l$ and is journaled upon an extension $h$ of the bearing brass H, so as to turn thereon. One of the arms of the brush carrier is adapted to extend up close to the interior surface of the casing F and in this said arm, a handle M is screwed or otherwise fixed (which however first passes through the casing F) and thus joints the brush carrier and casing together, so that in moving one by the handle M, the other is moved also. The object of this is, that when the casing is off, the brushes are properly mounted and the machine will work without the case; and when the casing is on, and it is necessary to adjust the position of the brushes, this is done by means of the casing itself, by moving casing and brush carrier both together about an axis which is preferably the axis of the shaft.

As in electrical machines which work for long periods continuously, it is necessary to have access to the brushes and commutator very frequently, probably three or four times a day, for the purpose of adjustment, inspection and repairs, the casing or parts thereof are made as light as possible and the means of fastening such as can be operated with little trouble.

In Figs. 1 and 2 the commutator casing is held together by only four bolts $f$ which can be quickly taken out, but in Figs. 5 and 6 we show a hinged fastening.

It will be seen from Fig. 6 that on each half of the casing F two lugs N are arranged, one pair being provided with holes and the other pair having round spindles $n$ which engage hinge like into the said holes of the first named lugs N. On the lower side of the casing F, one lug O is arranged on each half, and a bolt P having two parts arranged eccentric to one another, engages with holes in the said lugs O so that on the turning of the bolt P in the said holes, the two parts of the casing are drawn together and locked in position. It is obvious that by this arrangement the casing can be removed in a very short space of time, and can be as quickly replaced.

As the brushes in the former described apparatus move with the adjustable cover the separate brush carrier L may be dispensed with, though not so convenient for erection, and the brushes Q may be attached direct to the adjustable casing F by the spindles and nuts $b'$, as shown in Figs. 7 and 8. In this arrangement also the adjustable joint between the casing F and the main casing B is made by two faced flanges R in one of which are provided slots $r$ in which the attachment bolts may travel, when it is desired to move the adjustable casing F and the brushes upon the main casing B.

Having fully described our invention, what we claim, and desire to secure by Letters Patent, is—

1. In a dynamo electric generator or motor, having a flame-tight casing completely surrounding the armature commutator and brushes, a casing fitting closely in contour and covering the commutator and brushes and connected with the latter, adapted to be capable of rotation about an axis, and sliding flame-tight joints between itself and the fixed adjacent parts of the machine, to permit of adjustment of the lead of the brushes without removal of any part of the casing.

2. In a dynamo electric generator or motor, having a flame-tight casing completely surrounding the armature, commutator and brushes, a casing covering the commutator and brushes and adapted to rotate about an axis for adjustment in combination with a brush carrier and a detachable handle making a joint with said casing and connecting the brush carrier and casing together for simultaneous rotation about the same axis for adjustment, substantially as described.

3. In a dynamo electric generator or motor, having a flame-tight casing, completely surrounding the armature, commutator and brushes, a casing covering the commutator and brushes constructed in parts hinged together and with means for fastening same, substantially as described.

In testimony whereof we have signed our names to this specification in the presence of two subscribing witnesses.

WALTER THOMAS GOOLDEN.
LLEWELYN BIRCHALL ATKINSON.

Witnesses:
RICHARD A. HOFFMANN,
CHARLES H. CARTER.